United States Patent
Brandhorst et al.

(10) Patent No.: US 8,056,304 B2
(45) Date of Patent: Nov. 15, 2011

(54) METHOD OF, AND APPARATUS FOR, HANDLING NAPPIES

(75) Inventors: Björn Brandhorst, Hörstel (DE); Josef Schulte, Aschendorf (DE)

(73) Assignee: Focke & Co. (GmbH & Co.), Verden (DE)

( * ) Notice: Subject to any disclaimer, the term of this patent is extended or adjusted under 35 U.S.C. 154(b) by 303 days.

(21) Appl. No.: 12/442,064

(22) PCT Filed: Aug. 1, 2007

(86) PCT No.: PCT/EP2007/006794
§ 371 (c)(1),
(2), (4) Date: Mar. 19, 2009

(87) PCT Pub. No.: WO2008/034488
PCT Pub. Date: Mar. 27, 2008

(65) Prior Publication Data
US 2010/0071318 A1   Mar. 25, 2010

(30) Foreign Application Priority Data
Sep. 21, 2006  (DE) .......................... 10 2006 045 087

(51) Int. Cl.
*B65B 35/44*   (2006.01)
*B65B 35/50*   (2006.01)
(52) U.S. Cl. ............... 53/153; 53/540; 53/447; 198/417
(58) Field of Classification Search .................... 53/443, 53/446, 447, 147, 153, 542, 540, 531; 414/268, 414/269, 272; 198/417, 442, 451
See application file for complete search history.

(56) References Cited

U.S. PATENT DOCUMENTS

| | | | | |
|---|---|---|---|---|
| 2,233,850 A | * | 3/1941 | Rapley | 198/408 |
| 3,462,912 A | * | 8/1969 | Anderson | 53/544 |
| 3,703,951 A | * | 11/1972 | Brockmuller | 198/447 |
| 4,141,193 A | * | 2/1979 | Joa | 53/529 |
| 4,226,324 A | * | 10/1980 | Stocker | 198/405 |
| 4,381,637 A | * | 5/1983 | Ballestrazzi et al. | 53/51 |
| 4,443,995 A | * | 4/1984 | Myers et al. | 53/443 |
| 4,539,795 A | * | 9/1985 | Wilkinson | 53/542 |
| 4,676,050 A | * | 6/1987 | Odenthal | 53/447 |
| 4,939,888 A | * | 7/1990 | Katz et al. | 53/411 |

(Continued)

FOREIGN PATENT DOCUMENTS
DE   12 38 834   4/1967
(Continued)

OTHER PUBLICATIONS
DE Search Report relating to German application No. 10 2006 045 087.6 filed Sep. 21, 2006.
(Continued)

*Primary Examiner* — Paul Durand
(74) *Attorney, Agent, or Firm* — Laurence P. Colton; Smith Risley Tempel Santos LLC (57) ABSTRACT

For the purpose of packaging diapers (10), the latter are fed to a grouping arrangement (13) in order to produce diaper groups (20, 21) from a plurality of diapers (10) positioned closely one beside the other. The diaper groups (20, 21) are fed along a plurality of conveying paths, in particular along two removal conveyors (35, 36) located one beside the other or one above the other, to a (multi-path) packaging machine or a plurality of packaging machines.

24 Claims, 9 Drawing Sheets

U.S. PATENT DOCUMENTS

| | | | |
|---|---|---|---|
| 4,949,532 A * | 8/1990 | Fujimagari et al. | 53/542 |
| 5,078,255 A * | 1/1992 | Haley | 198/358 |
| 5,095,684 A * | 3/1992 | Walker et al. | 53/443 |
| 5,411,250 A * | 5/1995 | Belec et al. | 271/185 |
| 5,430,994 A * | 7/1995 | Focke et al. | 53/493 |
| 5,433,063 A * | 7/1995 | Kovacs et al. | 53/550 |
| 5,588,285 A * | 12/1996 | Odenthal | 53/534 |
| 5,657,615 A * | 8/1997 | Muller | 53/448 |
| 5,732,536 A * | 3/1998 | Lin et al. | 53/535 |
| 5,733,099 A * | 3/1998 | Honneger | 414/788 |
| 5,897,291 A | 4/1999 | Gerwe | |
| 6,021,886 A | 2/2000 | Sierem | |
| 6,626,103 B2 * | 9/2003 | Neumann | 101/230 |
| 6,715,265 B2 * | 4/2004 | Franzaroli | 53/435 |
| 6,823,981 B2 * | 11/2004 | Ogle et al. | 198/417 |
| 6,868,653 B2 * | 3/2005 | Ballestrazzi et al. | 53/447 |
| 6,945,531 B2 * | 9/2005 | Perobelli et al. | 271/270 |
| 7,036,654 B2 * | 5/2006 | Frost | 198/406 |
| 7,877,965 B2 * | 2/2011 | Honegger | 53/450 |
| 2004/0098948 A1 * | 5/2004 | Caporali et al. | 53/443 |
| 2005/0055988 A1 | 3/2005 | Escobar | |
| 2005/0247547 A1 * | 11/2005 | Frost | 198/839 |
| 2007/0216082 A1 * | 9/2007 | Fenile et al. | 271/69 |

FOREIGN PATENT DOCUMENTS

| | | |
|---|---|---|
| DE | 25 59 138 | 7/1977 |
| DE | 28 37 092 | 1/1979 |
| DE | 42 15 642 | 11/1993 |
| DE | 196 01 664 | 7/1997 |
| DE | 100 19 069 | 10/2001 |
| EP | 1 162 146 A | 12/2001 |
| EP | 1 352 836 A | 10/2003 |
| EP | 1 681 250 | 7/2006 |

OTHER PUBLICATIONS

International Search Report relating to International application No. PCT/EP2007/006794.

* cited by examiner

METHOD OF, AND APPARATUS FOR, HANDLING NAPPIES

STATEMENT OF RELATED APPLICATIONS

This patent application claims the benefit of Patent Cooperation Treaty International Application No. PCT/EP2007/006794 having an International Filing Date of 1 Aug. 2007, which claims priority on German Patent Application No. 10 2006 045 087.6 having a filing date of 21 Sep. 2006, both of which are incorporated herein in their entireties by this reference.

BACKGROUND OF THE INVENTION

1. Technical Field

The invention relates to a method of handling planar articles, such as diapers, in particular for transporting the same and for feeding them to a packaging machine, wherein the articles, in particular diapers, coming individually one after the other from a production machine or a store, are combined into groups, in particular diaper groups, in the region of a grouping arrangement and these groups are fed to the packaging machine. The invention also relates to an apparatus for implementing the method.

2. Prior Art

Diapers are packaged as preferably folded, flat articles of in particular approximately rectangular or square shape. A respective diaper group made up of a number of abutting diapers forms the contents of a (bag) pack.

It is known to combine diaper groups by means of a compartmentalized belt (U.S. Pat. No. 5,897,291). The diapers are fed one after the other to the compartmentalized belt and are accommodated in interspaces formed between crosspieces of the compartmentalized belt. A number of diapers located one beside the other in the compartmentalized belt are pushed out, transversely to the orientation of the compartmentalized belt, by a pusher and set down as a diaper group on a platform. The latter can be moved upward and transfers the diaper group to a group conveyor which is arranged above the compartmentalized belt and transports the diaper groups one after the other to a packaging machine. This known apparatus has limited output capacity.

BRIEF SUMMARY OF THE INVENTION

It is an object of the invention to disclose a method and apparatus which result in a higher output capacity in the packaging of diapers and other flat articles.

In order to achieve this object, the method according to the invention is characterized in that the groups of articles or the diaper groups are fed along a plurality of transporting paths, in particular along two transporting paths, to a packaging machine or a plurality of packaging machines.

The method according to the invention is used, in particular, when one or more production machines means that the number of diapers produced per unit of time is considerably greater than the capacity of the downstream packaging machine. According to the invention, the groups are distributed over two (or more) product streams and fed either to a multi-track packaging machine or to a plurality of downstream packaging machines.

The incoming diapers, as they are transported in the region of the grouping arrangement, are distributed over two paths which are each assigned to a grouping subassembly for forming the diaper groups. One special feature is formation of preliminary groups with a number of diapers corresponding to a diaper group, in particular with the diapers arranged with mutual partial overlapping (imbricated formation). The diaper groups can be formed, at a high conveying capacity, from the preliminary groups.

Another special feature of the invention consists in that the incoming (individual) diapers are positioned in a horizontal plane and, as they are transported in the region of the grouping arrangement, are erected into a vertical plane.

The grouping arrangement according to the invention comprises conveying units, namely belts which interact in pairs, which transport the diapers between conveying strands directed toward one another. Branching conveyors form transporting paths which extend from a diverter or a branching location and are intended for individual diapers or for a preliminary group. Mechanisms for forming the groups comprise compartmentalized belts, which are directed in particular transversely to the incoming conveyors. The grouping arrangement preferably has two grouping subassemblies which are located one beside the other, form diaper groups simultaneously or at different times, and transfer them to at least two removal conveyors.

BRIEF DESCRIPTION OF THE DRAWINGS

Further details of the invention will be explained more specifically hereinbelow with reference to the drawings, in which.

DETAILED DESCRIPTION OF PREFERRED EMBODIMENTS

The exemplary embodiments in the drawings relate to the handling of diapers 10, these being comparatively flat, more or less rectangular articles which are produced by folding to form two legs of equal size. A rounded folding edge 11 is arranged to be oriented forward predominantly in the conveying direction. Instead of diapers 10, flat articles of a similar shape and size can be processed in the same way.

The diapers 10, which are fed individually from a production machine or from a store, are to be combined into groups, that is to say diaper groups 20, 21. Each diaper group 20, 21, corresponds to the contents of a pack which is to be produced. Accordingly, the diaper groups 20, 21 are fed to a packaging machine or a plurality of packaging machines (not shown). The present unit, which is referred to as a whole as a grouping arrangement 13, forms a handling station between the production machine and the packer.

The grouping arrangement 13 follows a feed conveyor 14, which feeds the individual diapers 10 in a horizontal plane, or with horizontal positioning, from a production machine. The grouping arrangement 13 basically comprises at least one receiving conveyor 15, following the feed conveyor 14, and branching conveyors 16, 17, which convey diapers 10 along two transporting paths. These are followed by grouping subassemblies 18, 19 for forming the diaper groups 20, 21 and for removing them along two separate paths. Each diaper group 20, 21 comprises diapers 10 which butt closely against one another in the upright state.

The conveyors for transporting the diapers 10 to the grouping subassembly 18, 19 are designed as belt conveyors or as endless belts and are arranged such that in each case two associated belts transport the diapers 10 between adjacent conveying strands.

Figure 1:
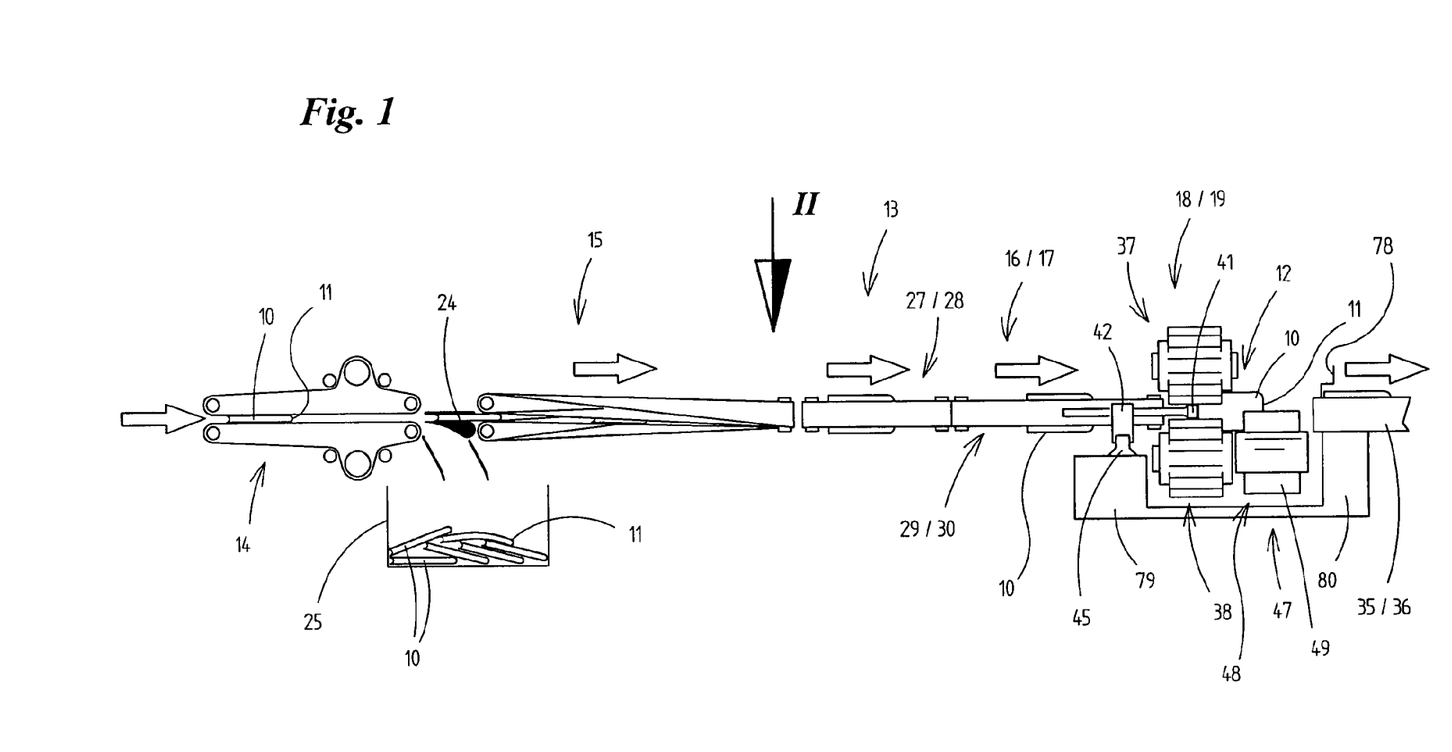
FIG. 1 shows a side view of an exemplary embodiment of a grouping arrangement.
Figure 2:
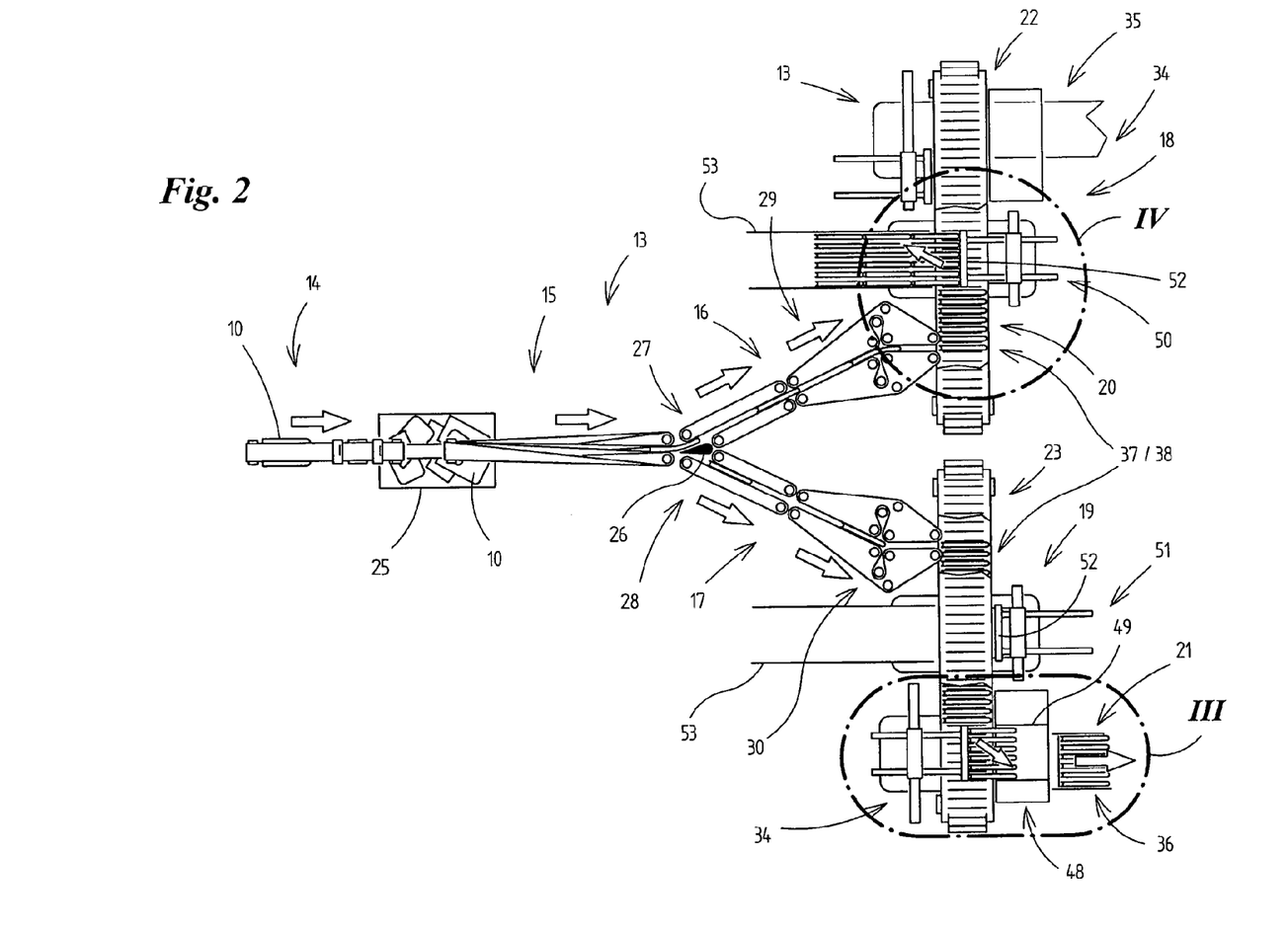
FIG. 2 shows a plan view of the grouping arrangement according to FIG. 1.

In the case of the exemplary embodiment according to FIG. 1, the diapers 10 are fed to the two branching conveyors 16, 17 by the receiving conveyor 15. These branching conveyors terminate directly in the region of the grouping subassemblies 18, 19, namely at transversely directed grouping conveyors 22, 23. The receiving conveyor 15 is designed as a turning conveyor or as a twist belt. Deflecting rollers are arranged with axes of rotation offset through 90°. The incoming diapers 10 are received with positioning in a horizontal plane and, as they are transported by the receiving conveyor 15, they are turned through 90° into an upright position. The belts of the branching conveyors 16, 17 are arranged such that the diapers 10 are transported in an upright position, that is to say by way of belts running in an upright plane.

An ejecting station for diapers 10 is formed between the feed conveyor 14 and the grouping arrangement 13, namely upstream of the receiving conveyor 15. An adjustable guide mechanism 24, positioned appropriately, can divert individual diapers 10, in particular defective products, downward into a collecting container 25.

The branching conveyors 16, 17 are arranged and designed in a particular way, namely for forming two diverging transporting paths for the diapers 10, in which case the latter arrive in a precisely positioned manner at the associated grouping subassemblies 18, 19. The branching conveyors 16, 17 are arranged one beside the other and in diverging formation in a common, horizontal plane and, in conveying terms, adjoin the receiving conveyor 15. An adjustable diverter or an adjustable directing mechanism 26 is arranged at the end of this receiving conveyor or in the inlet region of the branching conveyors 16, 17. By means of this directing mechanism, with corresponding relative positioning, the diapers 10, which arrive individually and at a spacing apart from one another, are fed, expediently alternately, either to the one branching conveyor 16, 17 or to the other.

Each branching conveyor 16, 17, comprises two pairs of associated belt conveyors. The diverter or the receiving conveyor 15 is adjoined by connection belts 27, 28. These transport the diapers 10 along rectilinear transporting paths which are arranged at an acute angle to one another. These are followed by respective transfer conveyors 29, 30. These transport the diapers to the grouping subassembly 18, 19 or to the grouping conveyors 22, 23.

The transfer conveyors 29, 30 made up of endless belts are designed in a particular way. Corresponding guidance of the associated conveying strands results in a conveying path being deflected such that an end region of the transfer conveyors 29, 30 which is directed toward the grouping subassemblies 18, 19 is oriented transversely or perpendicularly to the grouping conveyors 22, 23. Each belt of the transfer conveyors 29, 30 is provided with a compensating loop 31. This allows, in addition, a back and forth pivoting movement of the transfer conveyors 29, 30, or of the end regions directed toward the grouping subassemblies 18, 19, corresponding to the movement of the associated grouping conveyor 22, 23, that is to say in a horizontal plane.

The subassemblies for forming the diaper groups 20, 21 may be designed in different ways. They are based on the provision of at least one grouping conveyor 22, 23 which is directed, and can be moved, transversely to the conveying direction of the incoming diapers 10 and is intended for accommodating the diapers 10 to form diaper groups 20, 21. In the case of the exemplary embodiment according to FIGS. 1-5, the grouping conveyors 22, 23 provided are compartmentalized belts. These are endless belts with transversely projecting crosspieces 32 between which is formed a respective compartment 33 for accommodating a diaper 10. Relative movement takes place between the compartmentalized belts or grouping conveyors 22, 23, on the one hand, and the feed conveyors for the diapers 10, that is to say the branching conveyors 16, 17, on the other hand, such that the diapers 10 arriving one after the other are introduced into a free compartment 33 in each case (FIG. 4). Diaper groups 20, 21 formed in this way are transported out of the region of the branching conveyors 16, 17, by the grouping conveyor 22, 23 or the compartmentalized belt, to a pushing-out station 34. The latter is formed laterally in the case of the grouping subassemblies 18, 19, that is to say at a relatively large spacing apart from the branching conveyors 16, 17, to be precise in the region of removal conveyors 35, 36 which feed the diaper groups 20, 21 along separate transporting paths and, independently of one another to the packaging machine or the packaging machines.

The grouping conveyors 22, 23 comprise a top belt 37 and a bottom belt 38. In the case of the exemplary embodiment according to FIGS. 1-5, both are designed as compartmentalized belts. The diapers 10 are introduced between a bottom strand 39 of the top belt 37 and a top strand 40 of the bottom belt 38. Accordingly, each diaper 10 is retained in a top sub-region and in a bottom sub-region by mutually opposite crosspieces 32 of the compartmentalized belts. The diapers 10 rest on the top strand 40 of the bottom belt 38.

The two endless belts, namely compartmentalized belts, can be driven continuously or cyclically such that in each case one compartment 33, for receiving a diaper 10, is located opposite the end region of the one branching conveyor 16, 17 or the other (FIG. 4). As an alternative, or in addition, the end region of the branching conveyors 16, 17, in particular the end region of the transfer conveyors 29, 30, can be moved in the movement direction of the grouping conveyors 22, 23, that is to say of the compartmentalized belts 37, 38, such that the incoming diapers 10 can be fed one after the other to a free compartment 33.

In the region of the pushing-out station 34, the diaper group 20, 21 is pushed out of the compartmentalized belts or the grouping belts 22, 23 and transferred to the removal conveyor 35, 36. Provided for this purpose is a group pusher 41 which grips a number of diapers 10 which corresponds to a diaper group 20, 21 and pushes them out jointly from the region of the grouping conveyor 22, 23 or of the compartmentalized belt. In the case of this solution, accordingly, the diaper group 20, 21 is separated out of a continuous row of diapers 10 by the correspondingly dimensioned group pusher 41 (FIG. 3).

Figure 3:
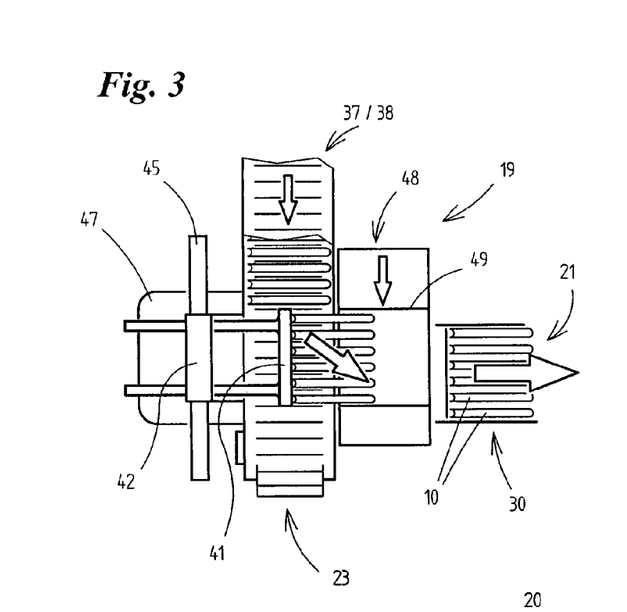
FIG. 3 shows, on an enlarged scale, a detail III from FIG. 2, namely a plan view of a pushing-out station for diaper groups.
Figure 4:
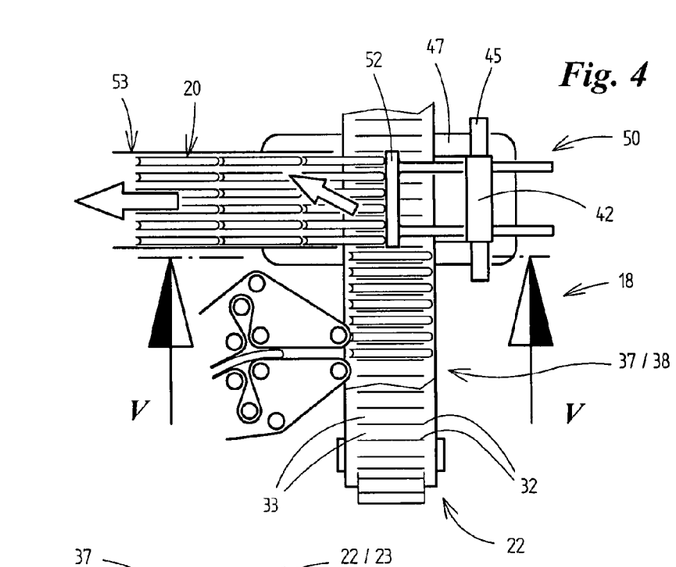
FIG. 4 shows, on an enlarged scale, another detail IV from FIG. 2, namely a discharging station for diaper groups.
Figure 5:
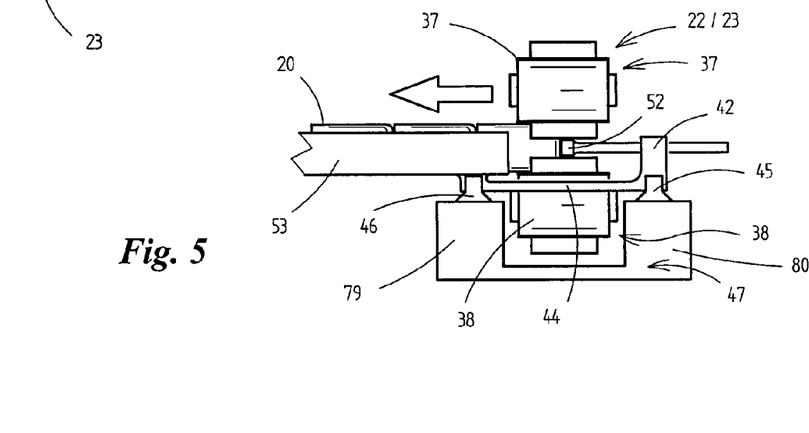
FIG. 5 shows the detail according to FIG. 4 as seen in side view along viewing plane V-V from FIG. 4.

In the case of preferably continuously driven grouping belts 22, 23 or compartmentalized belts in the direction of the pushing-out station 34, the group pusher 41 can be moved synchronously in the conveying direction at the same time as it executes the pushing-out movement (FIG. 3). For this purpose, the group pusher 41 is connected, via carrying rods, to a carriage 42 which is mounted such that it can be moved back and forth on a guide.

According to FIG. 3, the diapers 10 gripped by the group pusher 41 are transferred to an intermediate conveyor 48. The latter is designed as a belt which can be moved parallel to, and synchronously with the grouping conveyors 22, 23 and has a number of transverse crosspieces 49. The latter are arranged at a spacing apart from one another which corresponds to the width or transverse dimensioning of a diaper group 20, 21. The intermediate conveyor 48 is moved synchronously with the grouping conveyor 22, 23 while the diaper group 20, 21 is introduced into a holder formed between two adjacent transverse crosspieces 49. The intermediate conveyor 48 transfers the diaper group to the removal conveyor 35, 36, preferably while the intermediate conveyor 48 is at a standstill. A separate pick-up means 78, which can be moved back and forth above the removal conveyors 35, 36, grips the diaper group 20, 21 held on the intermediate conveyor 48 and guides this group into the region of the removal conveyor 35, 36.

A pushing out station which can be used on an auxiliary basis, namely an auxiliary station 50, 51 for each grouping conveyor 22, 23, is located in the region of the grouping subassemblies 18, 19. This auxiliary station 50, 51 accommodates diaper groups 20, 21 when the packaging machine, or one of the plurality of packaging machines, fails to operate in whole or in part. The diapers 10 are nevertheless still conveyed onward. Furthermore, the diaper groups 20, 21 are combined. However, these diaper groups are pushed out in the region of the auxiliary station 50, 51, that is to say they are not transferred to the removal conveyor 35, 36. According to FIGS. 2, 4 and 5, the diaper groups 20, 21, in the region of the auxiliary station 50, 51, are pushed off from the grouping conveyors 22, 23 in the opposite direction to the pushing-out station 34, to be precise by an auxiliary pusher 52 which is designed in a manner analogous to the group pusher 41, but is arranged on the opposite side in respect of the grouping conveyors 22, 23. The auxiliary pushers 52 convey the diaper groups 20, 21 into an auxiliary path 53, to be precise such that they follow one after the other in close succession. The diaper groups 20, 21 are removed, for example manually, in the region of the auxiliary path 53. If required, the diapers 10 are introduced into the packaging process again.

The auxiliary pushers 52 are designed in a manner analogous to the group pushers 41 and, by means of carriages 42, can be moved synchronously with the movement of the grouping conveyors 22, 23. The carriages 42 are mounted on guide rails 45, 46 which, for their part, are mounted on a machine framework 47 on both sides of the grouping subassemblies 18, 19. For this purpose, the machine framework 47 has upright legs 79, 80 on which are mounted, on the one hand, the guide rails 45, 46 and, on the other hand, the removal conveyors 35, 36 (FIG. 1). In the region of the auxiliary stations 50, 51, the two legs 79, 80 are provided with guide rails 45, 46. On the one side, the guide rail 45 serves for accommodating the carriage 42 for the auxiliary pusher 52. On the opposite side, the auxiliary path 53 is mounted, likewise by way of a carriage-like guide, on the guide rail 46. The guide of the auxiliary path 53 is connected to the carriage 42 via a connecting crosspiece 44, and the auxiliary pusher 52 can therefore be displaced as a unit with the auxiliary path 53, synchronously with the movement of the grouping conveyors 22, 23.

Figure 6:
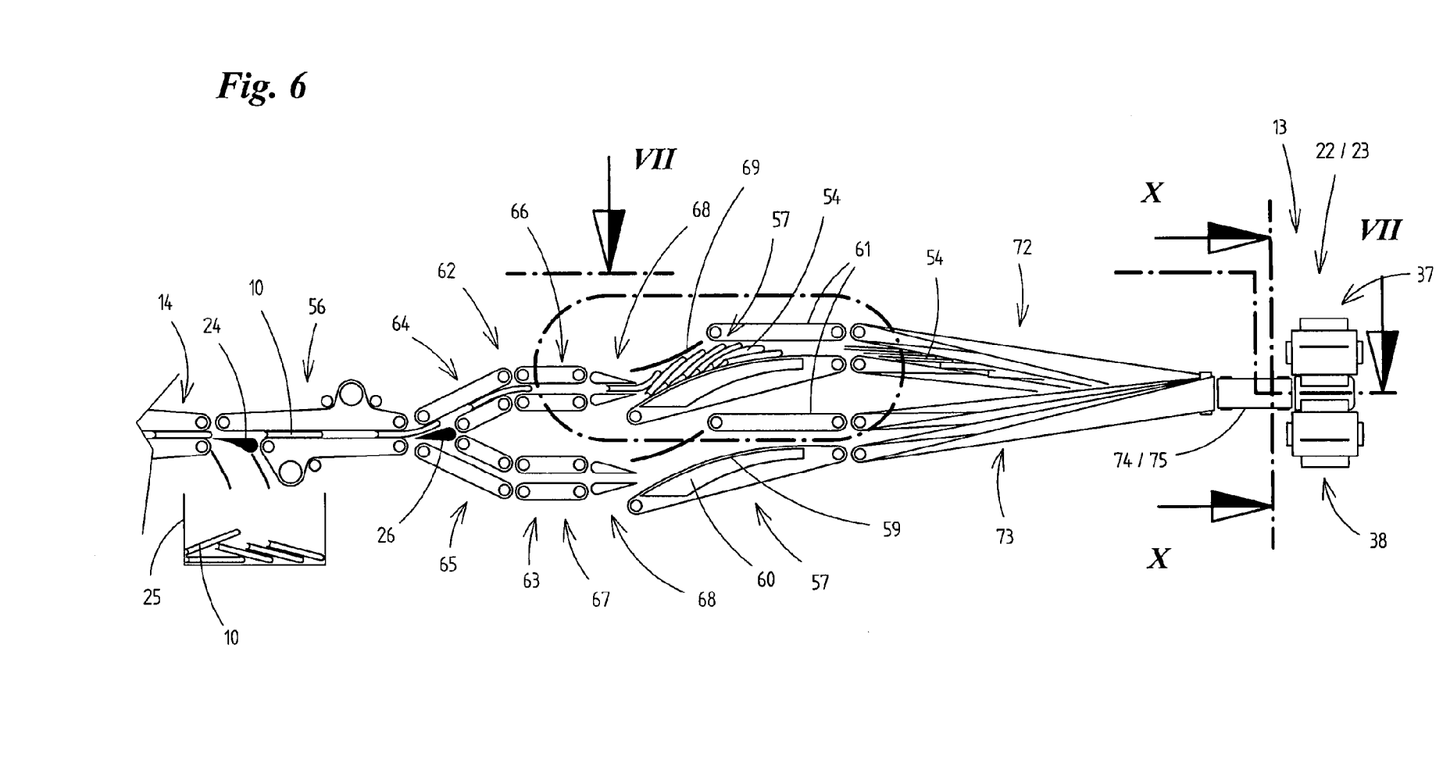
FIG. 6 shows a side view of another exemplary embodiment of the grouping arrangement.
Figure 7:
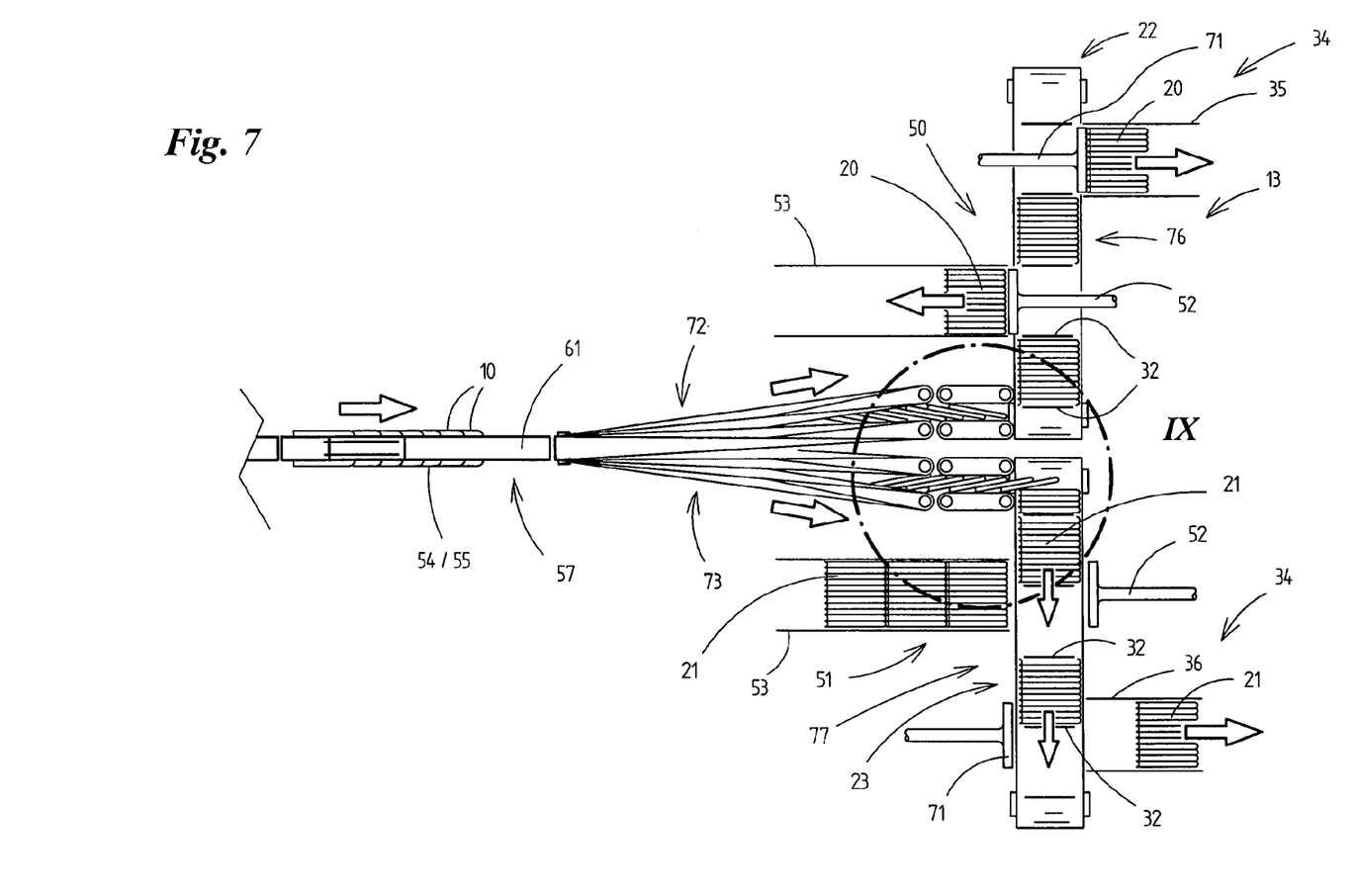
FIG. 7 shows the arrangement according to FIG. 6 in a plan view corresponding to viewing or section plane VII-VII from FIG. 6.
Figure 8:
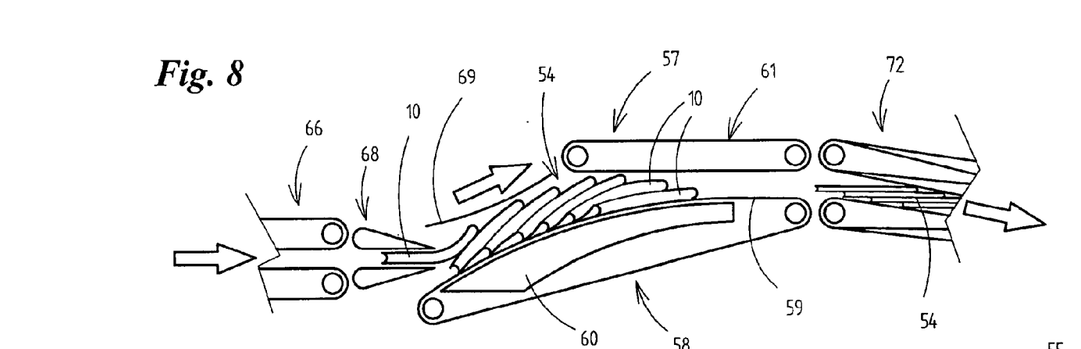
FIG. 8 shows, on an enlarged scale, a detail VIII from FIG. 6.
Figure 9:
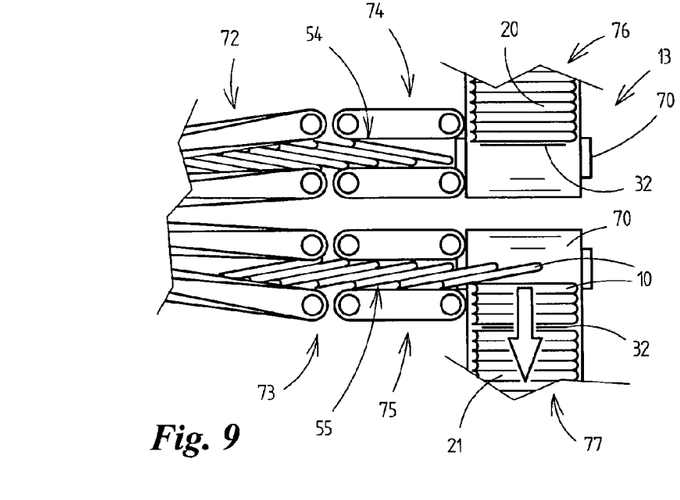
FIG. 9 shows, on an enlarged scale, a detail IX from FIG. 7.

A special exemplary embodiment is shown in FIGS. 6-10. The special feature consists in that, upstream of the grouping subassemblies 18, 19, diapers 10 corresponding to a diaper group 20, 21 are guided together to form a preliminary group 54, 55 and are transported as such until they are transferred to the grouping subassemblies 18, 19. The diapers 10 of the preliminary group 54, 55 are arranged with mutual partial overlapping in relation to one another, that is to say they are formed in an imbricated manner (FIGS. 6, 8 and 9).

The diapers 10 transported by the feed conveyor 14 are transferred to a preliminary conveyor 56. The latter transports the diapers 10 to an imbricating conveyor 57, in the region of which the preliminary group 54, 55 is formed or the imbricated formation of the diapers 10 is created. For this purpose, the imbricating conveyor 57 comprises a (bottom) carrier belt 58, on which the diapers 10 rest as the imbricated formation is formed. The carrier belt 58 is of air-permeable design, in particular it is designed as a perforated belt. Located beneath a conveying strand 59 is a suction box or a vacuum chamber 60 which generates a negative pressure for the diapers 10 in the transporting region, and the diapers 10 are therefore forced onto the conveying strand 58, with the formation in which they are arranged being maintained in the process.

The carrier belt 58 has a double function, that is to say it acts as an accumulating mechanism for the incoming diapers 10. The diapers 10 are collected in the region of the carrier belt 58 and, on account of the reduced conveying speed of the latter, deposited with partial overlapping. The imbricated formation is conveyed by a supporting belt 61 which is arranged above the carrier belt 58 and which forces the preliminary group 54 onto the conveying strand 59.

The imbricating conveyor 57 is integrated in a conveying system. In the case of the exemplary embodiment according to FIG. 6, the preliminary conveyor 56 is followed by two conveying sub-units 62, 63 which convey first of all the individual diapers 10 and then the preliminary groups 54, 55 along separate transporting paths in order to increase the output capacity. These transporting paths, or the conveying sub-units 62, 63, are arranged one above the other.

Arranged in the inlet region of the conveying sub-units 62, 63, that is to say following the preliminary conveyor 56, is a directing mechanism 26 which feeds the diapers 10 in the manner described alternatively to one conveying sub-unit 62, 63 or the other. Following the directing mechanism 26, the diapers 10 are received by oblique conveyors 64, 65 and transferred to parallel conveyors 66, 67 arranged one above the other. These are followed by a mouthpiece 68 for transferring the diapers 10 to the curved conveying strand 59 of the imbricating conveyor 57. On account of the configuration and arrangement of the imbricating conveyor 57, the diapers 10 are transferred to the conveying strand 59 at an acute angle which is advantageous in conveying terms. A fixed guide 69 is arranged on the top side.

The preliminary groups 54, 55, which are transported along two paths one above the other, are received by branching conveyors 72, 73 and transported to the grouping subassemblies 18, 19. The branching conveyors 72, 73 here are designed in a particular way, that is to say with a double function. On account of corresponding relative positioning of deflecting rollers, the diapers 10 are turned, as a preliminary group 54, 55, during transportation, that is to say they are moved into an upright position. Furthermore, corresponding guidance of the belts of the branching conveyors 72, 73 means that the latter, in the regions assigned to the grouping subassemblies 18, 19, run at a horizontal spacing apart from one another, that is to say corresponding to the position of transfer of the diapers to grouping conveyors 76, 77.

Following the branching conveyors 72, 73, the diapers 10 or imbricated preliminary groups 54, 55 are received by parallel transfer conveyors 74, 75. The latter open out directly in the region of the grouping subassemblies 18, 19, namely upstream of transversely directed grouping conveyors 76, 77.

Figure 10:
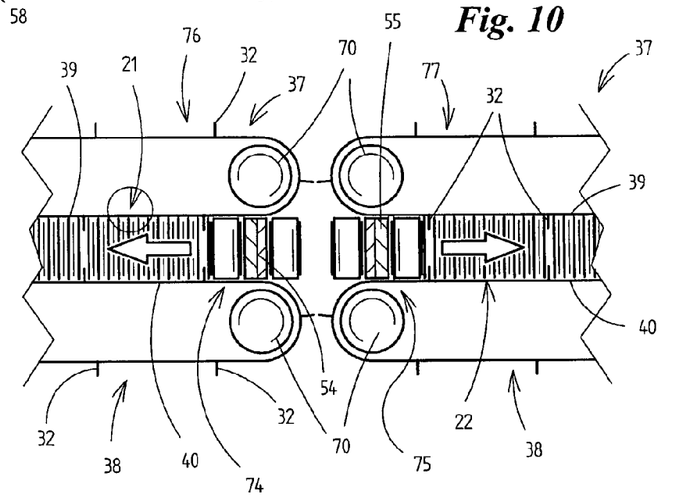
FIG. 10 shows a cross section or a transverse view, in the region of a grouping subassembly, corresponding to section plane X-X in FIG. 7.
Figure 11:
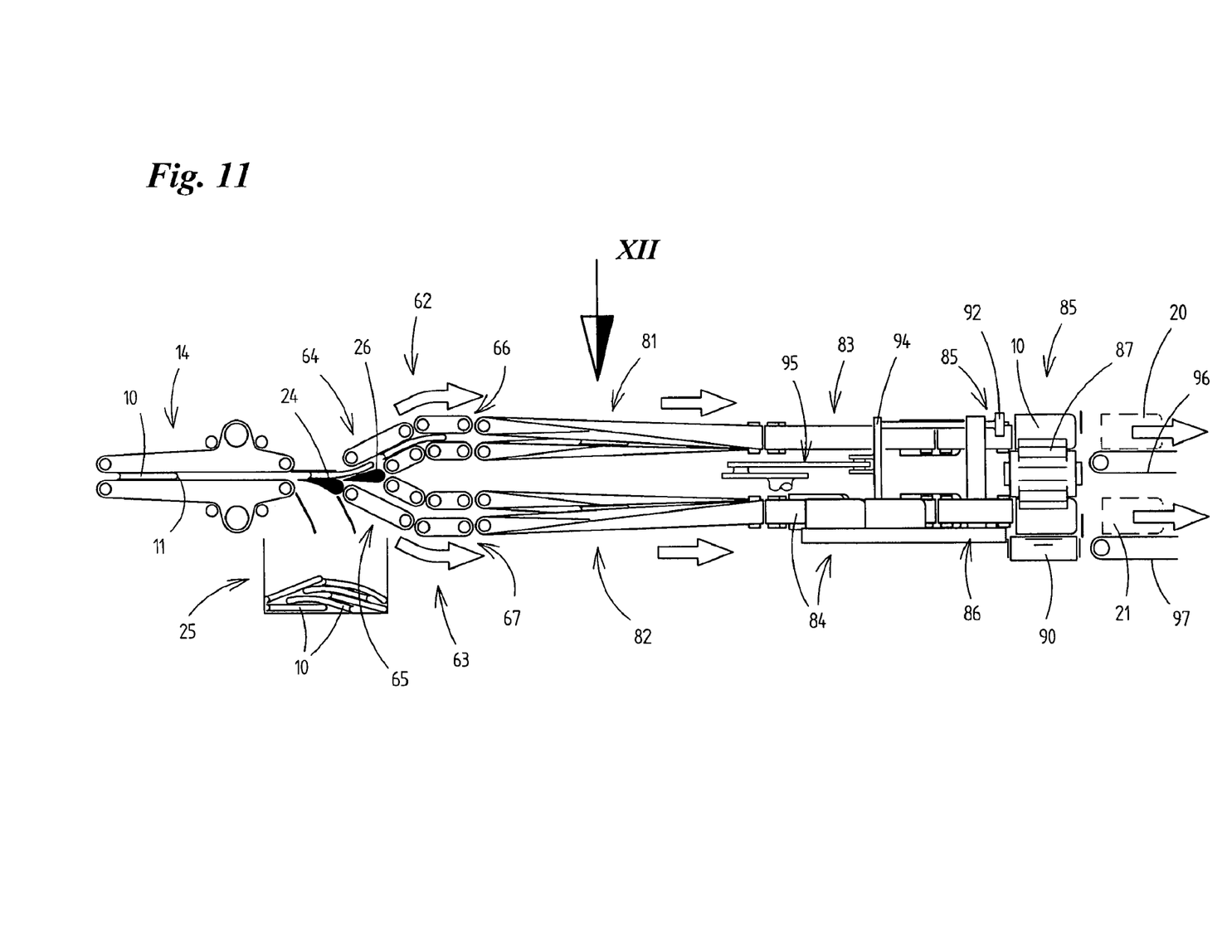
FIG. 11 shows a side view of a further exemplary embodiment of the arrangement.
Figure 12:
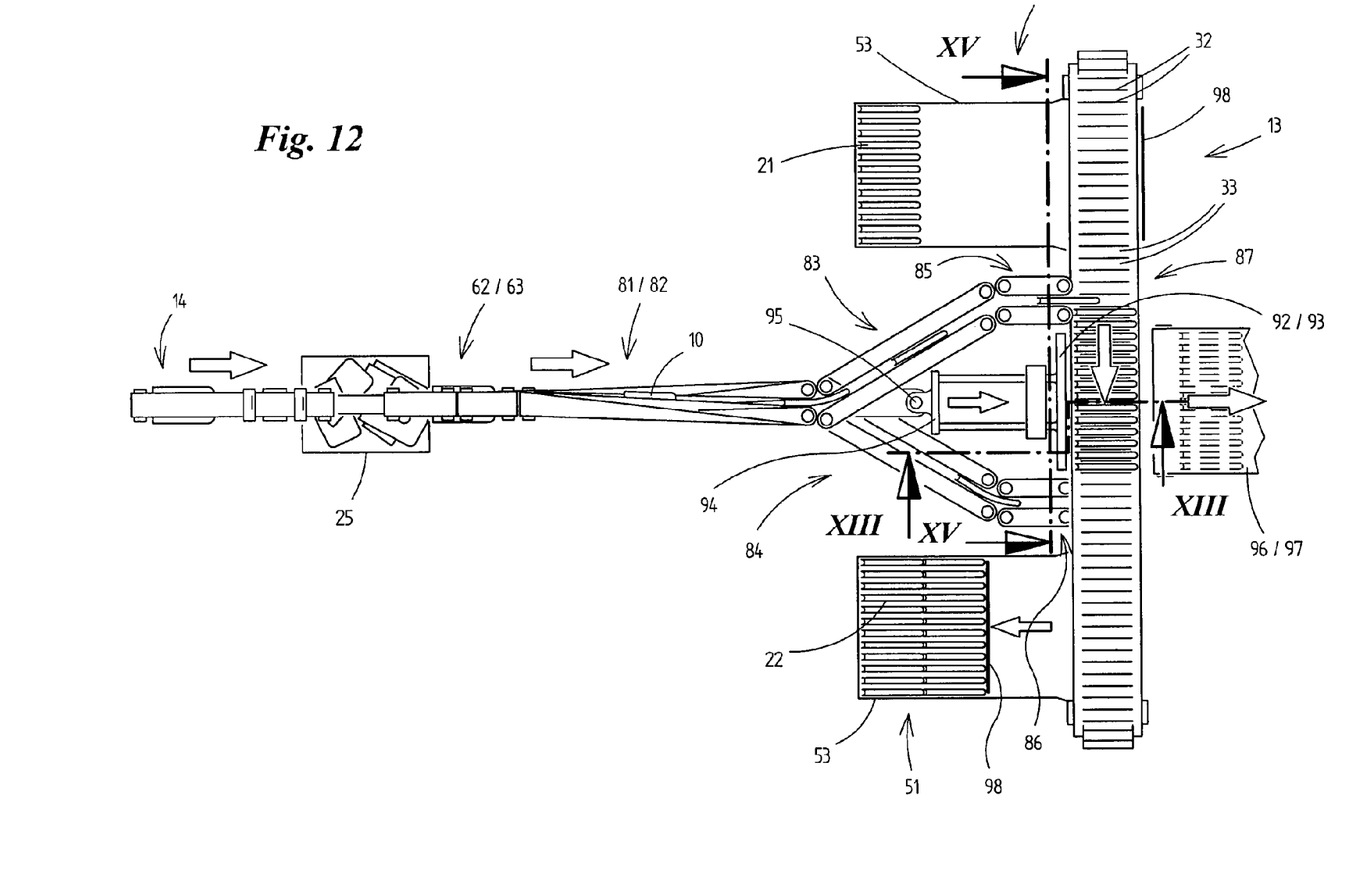
FIG. 12 shows the arrangement according to FIG. 11 in a plan view corresponding to arrow XII in FIG. 11.
Figure 13:
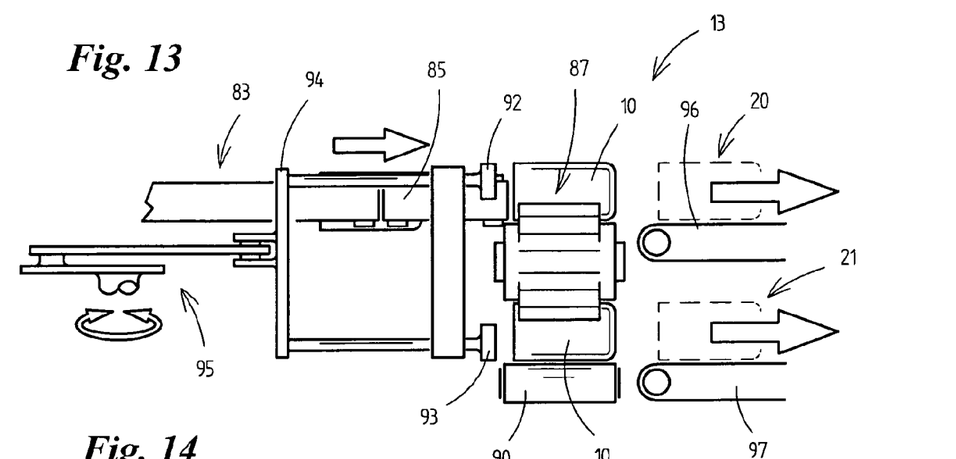
FIG. 13 shows a detail from FIG. 12, namely a pushing-out station for diaper groups corresponding to section or viewing plane XIII in FIG. 12.
Figure 14:
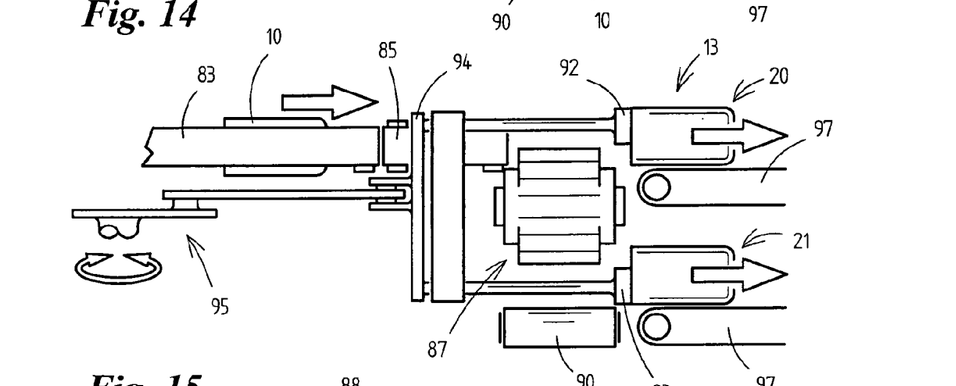
FIG. 14 shows the detail according to FIG. 13, with different positioning of mechanisms.
Figure 15:
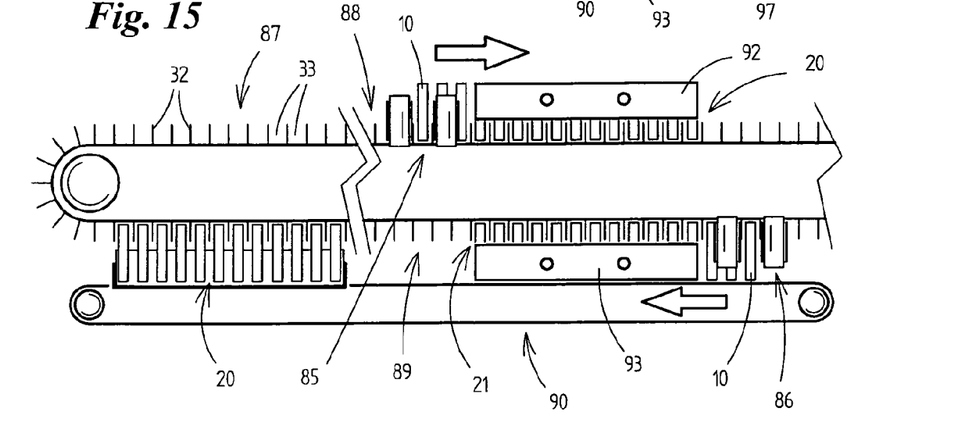
FIG. 15 shows on an enlarged scale, a longitudinal view of a grouping conveyor of the arrangement according to FIG. 12 as seen along viewing plane XV-XV.

The grouping station is designed in a manner analogous to the exemplary embodiment according to FIGS. 1-5, namely with two grouping conveyors 76, 77 which transport transversely and in opposite directions. These grouping conveyors are designed as modified compartmentalized conveyors, namely as pocket conveyors, with crosspieces 32 which are arranged at a spacing apart from one another which corresponds to the dimensioning of a diaper group 20, 21. Accordingly, a diaper group 20, 21 fits between successive crosspieces 32. It is also the case in this exemplary embodiment, for problem-free handling of the diapers 10, or diaper groups 20, 21, that a top belt 37 and bottom belt 38 are provided for forming a respective grouping conveyor 76, 77. The crosspieces 32 of the associated conveyors are positioned such that a diaper group 20, 21 is supported on a top strand 40 of the bottom belt 38 and retained by the crosspieces 32 of a bottom strand 39 of the top belt 37 (FIG. 10).

The transfer of the imbricated diapers 10 of the preliminary groups 54, 55 to the grouping conveyors 76, 77 takes place in a particular way, namely adjacent to a deflecting roller 70 of the relevant grouping conveyor 76, 77. The diapers 10 are set down one after the other, and in alignment, on the top strand 40 of the bottom belt 38 or are introduced between the top strand 40 and bottom strand 39. The structure of the preliminary groups 54, 55 allows the diapers to be deposited on the grouping conveyors 76, 77 by virtue of a diaper 10 being positioned against the sub-group which has already been formed on the grouping conveyors 76, 77. On the free side, the diapers 10 which are to be deposited are supported, on account of the imbricated formation, by following diapers. The conveying speed of the transfer conveyors 74, 75 and the transversely directed movement of the grouping conveyors 76, 77 are coordinated with one another.

Each grouping conveyor 76, 77 is assigned a pushing-out station 34 corresponding to the previous exemplary embodiment. The diaper groups 20, 21 are pushed off from the grouping conveyor 76, 77 onto the removal conveyor 35, 36 directly by a transverse pusher 71. The transverse pusher 71 is coordinated with the dimensions of a pocket between the adjacent crosspieces 32. The movements of the conveyors are coordinated with one another, that is to say the movements of the transfer conveyors 74, 75, on the one hand, and of the grouping conveyors 76, 77, on the other hand. Conveying gaps are produced between the successive preliminary groups 54, 55. The movement of the grouping conveyors 76, 77 takes account of these gaps. Once a diaper group 20, 21 has been formed between adjacent crosspieces 32, the respective grouping conveyor 76, 77 is stopped, the relative positioning being selected such that a previously formed diaper group 20, 21 is located in the region of a transverse pusher 71 of a pushing-out station 34. While the conveyor is at a standstill, the relevant diaper group 20, 21 is pushed off from the grouping conveyor 76, 77, and onto the adjacent removal conveyor 35, 36, by the transverse pusher 71. Once the transverse pusher 71 has returned into the starting position, the grouping conveyor 76, 77 is made to move once again in coordination with the transfer conveyors 74, 75 in order to accommodate the diapers 10 of a following preliminary group 54, 55.

Auxiliary stations 50, 51 are positioned in the same way in the region of the grouping arrangement 13 of this exemplary embodiment, that is to say with an auxiliary path 53 and an auxiliary pusher 52, which can likewise operate, for the reasons described, during a standstill phase of the respective grouping conveyor 76, 77.

In the case of the third alternative, according to FIGS. 11 to 15, the feed conveyor 14 is followed by a double-action deflecting system for the individual diapers 10. The guide mechanism 24 serves for deflecting individual diapers 10 into the collecting container 25. This is followed immediately by the directing mechanism 26, which directs diapers 10 alternatively into two conveying paths, arranged one above the other, for the diapers 10. The directing mechanism 26 is located in the initial region of conveying sub-units 62, 63, which are designed in a manner analogous to the exemplary embodiment according to FIG. 6. Two turning conveyors 81, 82, which are arranged parallel one above the other, follow, in the form of intermediate conveyors, the parallel conveyors 66, 67 in a manner corresponding to the receiving conveyor 15 according to FIGS. 1 and 2. The diapers 10 are transferred in an upright plane by the turning conveyors 81, 82 to branching conveyors 83, 84, that is to say to pairs of belts which are arranged in planes located one above the other and—as seen in plan view (FIG. 12)—diverge at an acute angle in the conveying direction. Transfer conveyors 85, 86, which are oriented parallel or in the conveying direction, follow immediately adjacent to the grouping station, likewise in offset horizontal planes.

The grouping station with a single, transversely directed grouping conveyor 87 configured as a compartmentalized belt is designed in a particular way. The grouping conveyor 87 extends, as an endless conveyor, transversely over the entire grouping station. The diapers 10 are transferred in vertically offset planes to the grouping conveyor 87. The branching conveyor 83, or the transfer conveyor 85 assigned to the same, transfers the diapers 10 to a top strand 88 of the grouping conveyor 87. The diapers of the transfer conveyor 86 are introduced into the compartments 33 of the compartmentalized belt in the region of a bottom strand 89. Relative movement takes place between the conveyors, that is to say, in particular, a movement of the grouping conveyor 87 which is coordinated with the feeding of the diapers 10, and the diapers 10 which form a diaper group 20 are therefore collected one after the other. The bottom strand 89 is moved correspondingly in the opposite direction such that diapers from the transfer conveyor 86 are accommodated at the same time in the region of the bottom strand 89. In the region of the top strand 88, the diapers 10 are supported on the latter. In the region of the bottom strand 89, the latter has arranged beneath it a supporting mechanism corresponding to the height of the diapers 10, in this case a carrying belt 90 which moves in the direction, and at the speed, of the bottom strand 89.

On account of the diapers 10 for the respective diaper group 20, 21, being collected in opposite directions, a pushing-out station 91 is formed approximately centrally, but in any case between the transfer conveyors 85, 86. Two group pushers 92, 93 are arranged one above the other and are actuated simultaneously in order to push out a respective diaper group 20, 21 in planes arranged one above the other. The group pushers 92, 93 operate in each case in the region outside the compartments 33 or the crosspieces 32, namely above the top strand 88, on the one hand, and beneath the bottom strand 89, on the other hand. The group pushers 92, 93 are arranged on a common carrier 94 which can be moved back and forth by an actuating mechanism 95. The carrier 94 has arranged on it in each case carrying rods of the group pushers 92, 93 above and beneath the top strand 88 and bottom strand 89. The actuating mechanism 95 here is designed as a crank mechanism and can be driven on a constant basis in coordination with the feeding of the diapers 10. The grouping conveyor 87 is expediently stopped during the pushing-out operation. Located on the side opposite to the group pushers 92, 93 are removal conveyors 96, 97, which are designed as belts and are likewise located in planes one above the other.

In the case of this exemplary embodiment too, auxiliary stations 50, 51 are set up in the region of the grouping conveyor 87, to be precise adjacent to the deflecting locations of the endless compartmentalized belt. The auxiliary stations 50, 51 are provided in each case with an auxiliary path 53, by means of which diaper groups 20, 21 which are to be separated out are conveyed away in a direction opposite to the conveying direction of the removal conveyors 96, 97. The auxiliary paths 53 are assigned auxiliary pushers 98.

The exemplary embodiments described are interchangeable in respect of individual subassemblies. In particular the concept of the formation of preliminary groups of diapers can be applied to all the embodiments.

List of designations

| | | | |
|---|---|---|---|
| 10 | diaper | 11 | folding edge |
| 12 | | 13 | grouping arrangement |
| 14 | feed conveyor | 15 | receiving conveyor |
| 16 | branching conveyor | 17 | branching conveyor |
| 18 | grouping subassembly | 19 | grouping subassembly |
| 20 | diaper group | 21 | diaper group |
| 22 | grouping conveyor | 23 | grouping conveyor |
| 24 | guide mechanism | 25 | collecting container |
| 26 | directing mechanism | 27 | connection belt |
| 28 | connection belt | 29 | transfer conveyor |
| 30 | transfer conveyor | 31 | compensating loop |
| 32 | crosspiece | 33 | compartment |
| 34 | pushing-out station | 35 | removal conveyor |
| 36 | removal conveyor | 37 | top belt |
| 38 | bottom belt | 39 | bottom strand |
| 40 | top strand | 41 | group pusher |
| 42 | carriage | 43 | carrying rod |
| 44 | connecting crosspiece | 45 | guide rail |
| 46 | guide rail | 47 | machine framework |
| 48 | intermediate conveyor | 49 | transverse crosspiece |
| 50 | auxiliary station | 51 | auxiliary station |
| 52 | auxiliary pusher | 53 | auxiliary path |
| 54 | preliminary group | 55 | preliminary group |
| 56 | preliminary conveyor | 57 | imbricating conveyor |
| 58 | carrier belt | 59 | conveying strand |
| 60 | vacuum chamber | 61 | supporting belt |
| 62 | conveying sub-unit | 63 | conveying sub-unit |
| 64 | oblique conveyor | 65 | oblique conveyor |
| 66 | parallel conveyor | 67 | parallel conveyor |
| 68 | mouthpiece | 69 | guide |
| 70 | deflecting roller | 71 | transverse pusher |
| 72 | branching conveyor | 73 | branching conveyor |
| 74 | transfer conveyor | 75 | transfer conveyor |
| 76 | grouping conveyor | 77 | grouping conveyor |
| 78 | pick-up means | 79 | leg |
| 80 | leg | 81 | turning conveyor |
| 82 | turning conveyor | 83 | branching conveyor |
| 84 | branching conveyor | 85 | transfer conveyor |
| 86 | transfer conveyor | 87 | grouping conveyor |
| 88 | top strand | 89 | bottom strand |
| 90 | carrying belt | 91 | pushing-out station |
| 92 | group pusher | 93 | group pusher |
| 94 | carrier | 95 | actuating mechanism |

-continued

List of designations

| | | | |
|---|---|---|---|
| 96 | removal conveyor | 97 | removal conveyor |
| 98 | auxiliary pusher | | |

The invention claimed is:

1. An apparatus for handling planar or thin-walled, rectangular or square articles in conjunction with groups of articles being fed to a packaging machine, wherein the groups are combined at a grouping arrangement (13) by grouping conveyors (22, 23; 76, 77; 87) and then fed to the packaging machine in groups, comprising:
   a) a feed conveyor (14, 15) for transporting the articles in succession;
   b) two branching conveyors (16, 17) following the feed conveyors (14, 15), wherein the articles are directed from the feed conveyor (14) to one or the other of the two branching conveyors (16, 17);
   c) grouping subassemblies (18, 19) each having a grouping conveyor (22, 23), wherein each branching conveyor (16, 17) leads to one of the grouping subassemblies (18, 19), each of which is for forming a group of articles from the articles supplied by the branching conveyors (16, 17); and
   d) a conveyor comprising two belt conveyors,
   wherein the articles are transported by the feed conveyor (14) in a horizontal plane and the articles or preliminary groups (54, 55) of the articles are conveyed during further transport by the conveyor comprising two belt conveyors, which turn the articles from the horizontal plane into a vertical plane such that the articles are fed in an upright position to the grouping arrangement (13) or to the grouping conveyors (22, 23; 87).

2. The apparatus as claimed in claim 1, wherein the articles are diapers (10) and the groups of articles are diaper groups (20, 21).

3. The apparatus as claimed in claim 1, wherein the articles are diapers (10) and the groups of articles are diaper groups (20, 21), the diapers (10) are formed at an imbricating conveyor (57) for the formation of the preliminary groups (54, 55) with imbricated partial overlapping of the diapers (10), the imbricating conveyor (57) having a curved or obliquely directed conveying strand (57) which is subjected to negative pressure via a vacuum chamber (60) for the purpose of fixing the diapers (10) transported by the imbricating conveyor (57).

4. The apparatus as claimed in claim 3, wherein, for feeding preliminary groups (54, 55) made up of imbricated diapers (10), the grouping conveyors (76, 77) have crosspieces (32) which are arranged at a spacing apart from one another which corresponds to the transverse dimensioning of a diaper group (20, 21), and the diapers (10) are fed to the grouping conveyor (76, 77) with direct abutment against adjacent the diapers (10) of sub-groups which have already been formed between adjacent crosspieces (32).

5. The apparatus as claimed in claim 1, wherein the articles are diapers (10) and the groups of articles are diaper groups (20, 21), the branching conveyors (16, 17; 52, 53; 83, 84) for the diapers (10), which are arranged to diverge at an acute angle, are followed by parallel transfer conveyors (29, 30; 74, 75; 85, 86), which are directed approximately perpendicularly or transversely to the grouping conveyors (22, 23; 76, 77; 87).

6. The apparatus as claimed in claim 1, wherein the articles are diapers (10) and the groups of articles are diaper groups (20, 21), and, for feeding preliminary groups (54, 55) made up of imbricated diapers (10), the grouping conveyors (76, 77) have crosspieces (32) which are arranged at a spacing apart from one another which corresponds to the transverse dimensioning of a diaper group (20, 21), and the diapers (10) are fed to the grouping conveyor (76, 77) with direct abutment against adjacent diapers (10) of sub-groups which have already been formed between adjacent crosspieces (32).

7. The apparatus as claimed in claim 1, wherein:
a) the articles are diapers (10) and the groups of articles are diaper groups (20, 21);
b) the grouping conveyors (22, 23) are arranged transversely to the feeding conveyor (14) or the branching conveyors (16, 17);
c) the grouping conveyors (22, 23) are driven in opposite directions such that a top belt (37) of each grouping conveyor (22, 23) feeds the diaper groups (20, 21) to a removal conveyor (35, 36) associated with each grouping conveyor (22, 23) for the diaper groups (20, 21); and
d) at a pushing-out station (34) of the grouping conveyors (22, 23), the diaper groups (20, 21) are pushed from the grouping conveyor (22, 23) by a group pusher (41) and in each case fed to the removal conveyor (34, 36).

8. The apparatus as claimed in claim 7, wherein:
the group pusher (41) runs along synchronously with the grouping conveyors (22, 23), in the conveying direction of the latter during the pushing-out movement;
the diaper groups (20, 21) are transferred to an intermediate conveyor (48), which is arranged alongside the grouping conveyor (22, 23), is moved synchronously with the grouping conveyors (22, 23) and has a holder for the diaper group (20, 21); and
the diaper groups (20, 21) are fed from the intermediate conveyor (48) to the respective removal conveyor (35, 36) by a separate pushing-out conveyor or pick-up means (78).

9. The apparatus as claimed in claim 1, wherein:
the articles are diapers (10) and the groups of articles are diaper groups (20, 21);
the grouping conveyors (22, 23; 76, 77) are formed from in each case two endless belts which are arranged one above the other and are compartmentalized conveyors or conveyors with crosspieces (32) which are spaced apart from one another at relatively large intervals; and
the diapers (10) or diaper groups (20, 21) are retained and transported in the region between a bottom strand (39) of a top belt (37), on the one hand, and a top strand (40) of a bottom belt (38), on the other hand.

10. The apparatus as claimed in claim 1, wherein:
the articles are diapers (10) and the groups of articles are diaper groups (20, 21); and
the grouping arrangement (13) comprises a common grouping conveyor (87) configured as a compartmentalized belt, with the diaper groups (20, 21) being formed, on the one hand, in the region of a top strand (88) and, on the other hand, in the region of a bottom strand (89), and associated removal conveyors (96, 97) for the diaper groups (20, 21) running in planes arranged one above the other.

11. The apparatus as claimed in claim 10, wherein the diapers, at the bottom strand (89), rest on a support, the support being a carrying belt (50) which can be moved continuously and synchronously with the bottom strand (89).

12. The apparatus as claimed in claim 10, wherein feed conveyors for the diapers (10) or preliminary groups (54, 55) of the diapers, the feed conveyors being the branching conveyors (83, 84) and/or transfer conveyors (85, 86), are guided, in accordance with the position of the top strand (88) and the bottom strand (89), in vertically offset planes and are spaced apart from one another in the conveying direction of the grouping conveyor (87) such that the diapers (10) or the preliminary groups (54, 55) of the diapers are fed to regions of the top strand (88) and of the bottom strand (89) of the common grouping conveyor (87).

13. The apparatus as claimed in claim 1, wherein:
the articles are diapers (10) and the groups of articles are diaper groups (20, 21); and
the grouping arrangement (13) has auxiliary stations (50, 51) at the grouping conveyors (22, 23; 76, 77; 87) for removing the diaper groups (20, 21) when the packaging machines are at a standstill or operating with reduced output, with each auxiliary station (50, 51) having an auxiliary path (53) for accommodating the diaper groups (20, 21), which can be introduced into the auxiliary paths (53) in the opposite direction to the removal conveyors (35, 36), by auxiliary pushers (52).

14. The apparatus as claimed in claim 1, wherein the articles are formed at an imbricating conveyor (57) for the formation of the preliminary groups (54, 55) with imbricated partial overlapping of the articles, the imbricating conveyor (57) having a curved or obliquely directed conveying strand (57) which is subjected to negative pressure via a vacuum chamber (60) for the purpose of fixing the articles transported by the imbricating conveyor (57).

15. The apparatus as claimed in claim 14, wherein, for feeding preliminary groups (54, 55) made up of imbricated articles, the grouping conveyors (76, 77) have crosspieces (32) which are arranged at a spacing apart from one another which corresponds to the transverse dimensioning of an article group, and the articles are fed to the grouping conveyor (76, 77) with direct abutment against adjacent the articles of sub-groups which have already been formed between adjacent crosspieces (32).

16. The apparatus as claimed in claim 1, wherein the branching conveyors (16, 17; 52, 53; 83, 84) for the articles, which are arranged to diverge at an acute angle, are followed by parallel transfer conveyors (29, 30; 74, 75; 85, 86), which are directed approximately perpendicularly or transversely to the grouping conveyors (22, 23; 76, 77; 87).

17. The apparatus as claimed in claim 1, wherein, for feeding preliminary groups (54, 55) made up of imbricated articles, the grouping conveyors (76, 77) have crosspieces (32) which are arranged at a spacing apart from one another which corresponds to the transverse dimensioning of an article group, and the articles are fed to the grouping conveyor (76, 77) with direct abutment against adjacent articles of sub-groups which have already been formed between adjacent crosspieces (32).

18. The apparatus as claimed in claim 1, wherein:
a) the grouping conveyors (22, 23) are arranged transversely to the feeding conveyor (14) or the branching conveyors (16, 17);
b) the grouping conveyors (22, 23) are driven in opposite directions such that a top belt (37) of each grouping conveyor (22, 23) feeds the article groups to a removal conveyor (35, 36) associated with each grouping conveyor (22, 23) for the article groups; and
c) at a pushing-out station (34) of the grouping conveyors (22, 23), the article groups are pushed from the grouping conveyor (22, 23) by a group pusher (41) and in each case fed to the removal conveyor (34, 36).

19. The apparatus as claimed in claim 18, wherein:
the group pusher (41) runs along synchronously with the grouping conveyors (22, 23), in the conveying direction of the latter during the pushing-out movement;

the article groups are transferred to an intermediate conveyor (48), which is arranged alongside the grouping conveyor (22, 23), is moved synchronously with the grouping conveyors (22, 23) and has a holder for the article group; and the article groups are fed from the intermediate conveyor (48) to the respective removal conveyor (35, 36) by a separate pushing-out conveyor or pick-up means (78).

20. The apparatus as claimed in claim 1, wherein:

the grouping conveyors (22, 23; 76, 77) are formed from in each case two endless belts which are arranged one above the other and are compartmentalized conveyors or conveyors with crosspieces (32) which are spaced apart from one another at relatively large intervals; and the articles or article groups are retained and transported in the region between a bottom strand (39) of a top belt (37), on the one hand, and a top strand (40) of a bottom belt (38), on the other hand.

21. The apparatus as claimed in claim 1, wherein:

the grouping arrangement (13) comprises a common grouping conveyor (87) configured as a compartmentalized belt, with the article groups being formed, on the one hand, in the region of a top strand (88) and, on the other hand, in the region of a bottom strand (89), and associated removal conveyors (96, 97) for the article groups running in planes arranged one above the other.

22. The apparatus as claimed in claim 21, wherein the articles, at the bottom strand (89), rest on a support, the support being a carrying belt (50) which can be moved continuously and synchronously with the bottom strand (89).

23. The apparatus as claimed in claim 21, wherein feed conveyors for the articles or preliminary groups (54, 55) of the articles, the feed conveyors being the branching conveyors (83, 84) and/or transfer conveyors (85, 86), are guided, in accordance with the position of the top strand (88) and the bottom strand (89), in vertically offset planes and are spaced apart from one another in the conveying direction of the grouping conveyor (87) such that the articles or the preliminary groups (54, 55) of the articles are fed to regions of the top strand (88) and of the bottom strand (89) of the common grouping conveyor (87).

24. The apparatus as claimed in claim 1, wherein:

the grouping arrangement (13) has auxiliary stations (50, 51) at the grouping conveyors (22, 23; 76, 77; 87) for removing the article groups when the packaging machines are at a standstill or operating with reduced output, with each auxiliary station (50, 51) having an auxiliary path (53) for accommodating the article groups, which can be introduced into the auxiliary paths (53) in the opposite direction to the removal conveyors (35, 36), by auxiliary pushers (52).

* * * * *

UNITED STATES PATENT AND TRADEMARK OFFICE
CERTIFICATE OF CORRECTION

Page 1 of 1

PATENT NO.         : 8,056,304 B2
APPLICATION NO.    : 12/442064
DATED              : November 15, 2011
INVENTOR(S)        : Bjorn Brandhorst and Josef Schulte It is certified that error appears in the above-identified patent and that said Letters Patent is hereby corrected as shown below:

On the title page, Item (73), replace "Focke & Co. (GmbH & Co.), Verden (DE)" with --Focke & Co. (GmbH & Co. KG), Verden (DE)--, such that item (73) reads:

(73)   Assignee:   Focke & Co. (GmbH & Co. KG), Verden (DE)

Signed and Sealed this
Fourteenth Day of May, 2013

Teresa Stanek Rea
*Acting Director of the United States Patent and Trademark Office*